(12) United States Patent
Lee

(10) Patent No.: US 8,130,292 B2
(45) Date of Patent: Mar. 6, 2012

(54) SCENE ILLUMINATION ADAPTIVE LENS SHADING CORRECTION FOR IMAGING DEVICES

(75) Inventor: Ji Soo Lee, Menlo Park, CA (US)

(73) Assignee: Aptina Imaging Corporation, George Town (KY)

( * ) Notice: Subject to any disclaimer, the term of this patent is extended or adjusted under 35 U.S.C. 154(b) by 601 days.

(21) Appl. No.: 12/347,515

(22) Filed: Dec. 31, 2008

(65) Prior Publication Data

US 2010/0165144 A1 Jul. 1, 2010

(51) Int. Cl.
*H04N 9/64* (2006.01)

(52) U.S. Cl. ......................... 348/251; 382/274

(58) Field of Classification Search ........................ None
See application file for complete search history.

(56) References Cited

U.S. PATENT DOCUMENTS

| | | | |
|---|---|---|---|
| 5,115,327 A | 5/1992 | Ishima | |
| 7,391,450 B2 | 6/2008 | Pinto et al. | |
| 2006/0244848 A1* | 11/2006 | Hori | 348/251 |
| 2007/0030379 A1 | 2/2007 | Agranov | |
| 2007/0097235 A1* | 5/2007 | Miller | 348/241 |
| 2007/0211154 A1 | 9/2007 | Mahmoud et al. | |
| 2007/0222878 A1 | 9/2007 | Tanifuji | |
| 2007/0247672 A1 | 10/2007 | Nguyen | |
| 2008/0074515 A1* | 3/2008 | Takane | 348/251 |
| 2008/0259186 A1* | 10/2008 | Wang et al. | 348/238 |
| 2009/0268053 A1* | 10/2009 | Wang et al. | 348/229.1 |

FOREIGN PATENT DOCUMENTS

| | | | |
|---|---|---|---|
| WO | WO 2007/042853 A1 | 4/2007 | |
| WO | WO 2007/075066 A1 | 7/2007 | |

\* cited by examiner

*Primary Examiner* — Nhan T Tran
*Assistant Examiner* — Dennis Hogue

(57) ABSTRACT

Methods, apparatuses, and systems for scene adaptive lens shading correction. One or more gain adjustment surfaces calibrated to a reference illuminant type is stored. At least one scene adjustment surface, which varies as a function of the illuminant type, is stored for each additional illuminant type for which lens shading correction is desired. Additionally, an imaging device with a color image sensor may define a gain adjustment surface and a scene adjustment surface for each of the color channels of the image sensor. Scene adaptive lens shading correction entails determining an illuminant type for a captured image, selecting a scene adjustment surface based on the determined illuminant type, and processing the image using a gain adjustment surface modified by the scene adjustment surface.

14 Claims, 7 Drawing Sheets

SCENE ILLUMINATION ADAPTIVE LENS SHADING CORRECTION FOR IMAGING DEVICES

FIELD OF THE INVENTION

Embodiments relate generally to lens shading correction for imaging devices.

BACKGROUND

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an image sensor, each cell including a photosensor, which may be a photogate, photoconductor, a photodiode, or other photosensor having a doped region for accumulating photo-generated charge. For CMOS imaging devices, each pixel cell has a charge storage region, formed on or in the substrate, which is connected to the gate of an output transistor that is part of a readout circuit. The charge storage region may be constructed as a floating diffusion region. In some CMOS imaging devices, each pixel cell may further include at least one electronic device such as a transistor for transferring charge from the photosensor to the storage region and one device, also typically a transistor, for resetting the storage region to a predetermined charge level.

One problem experienced in film and solid state cameras is lens shading. Lens shading can cause pixel cells in a pixel array located farther away from the center of the pixel array to have a lower pixel signal value when compared to pixel cells located closer to the center of the pixel array even when all pixel cells are exposed to the same illuminant condition. Optical vignetting and pixel vignetting are two sources of lens shading. Optical vignetting is the fall-off in irradiance inherent in optical lens systems and is more pronounced with wide angle lenses and lenses using wide open apertures. Pixel vignetting, on the other hand, is the fall-off in irradiance inherent in photosensors and is affected by many factors such as, for example, microlens placement, photosensor layout, and depth of the photon well.

Variations in a pixel value caused by lens shading can be measured and the pixel value can be adjusted to compensate for the lens shading. For example, lens shading can be adjusted using a set of positional gain adjustment values, which modify pixel values in post-image capture processing. Positional gain adjustments across the pixel array can be provided as digital gain values, one corresponding to each of the pixels. It may happen that the further away a pixel is from the center of the pixel array, the more gain is needed to be applied to the pixel value. The set of digital gain values for the entire pixel array forms a gain adjustment surface.

Lens shading correction for color image sensors may be defined for each of a plurality of color channels in order to correct for lens shading variations across color channels. For these color image sensors, the gain adjustment surface is applied to the pixels of the corresponding color channel during post-image capture processing to correct for variations in pixel value due to the spatial location of the pixels in the pixel array. Monochrome image sensors, on the other hand, apply a single gain adjustment surface to all pixels of a pixel array. Likewise, color image sensors may choose to use a single gain adjustment surface across all color channels.

Since lens shading correction applies a digital gain at every pixel location, the digital gain values need to be either pre-stored or digitally computed from a mathematical expression that mimics the desired pixel gain surface. In practice, the digital gain values are computed from an expression that approximates the desired pixel gain surface since the number of parameters needed to generate an approximate surface is generally significantly lower than the numbers of parameters needed to store the digital gain values for every pixel location. Some image sensors have built-in lens shading operation on-chip, while other image sensors rely on a separate image processing imaging chip for this operation.

It has been found that the lens shading properties of an image sensor can vary significantly with the spectral content of an imaged scene. When a gain adjustment surface is calculated for a specific color channel/camera/lens/IR-out filter, etc. combination, it is generally applied to all captured images from an imaging device having that combination. This does not present a particular problem when the captured image is taken under the same illuminant condition used to calibrate the gain adjustment surface. Lens shading, however, can vary significantly from one illuminate type to another. In FIG. 1, a plot of red pixel values along the center row of an image sensor is shown prior to lens shading correction. The plot illustrates the significant variation in lens shading under three illuminant conditions that are well-known to persons skilled in the art of image processing: D65, cool white fluorescent (CWF), and Type A flat-fields. Application of a gain adjustment surface calibrated for a particular illuminant type, e.g., D65 flat-field, to an image captured under a different illuminant type, e.g., Type A flat-field, can result in undesirable color shading errors.

Accordingly, methods, apparatuses, and systems providing lens shading correction for pixel values of images captured under varying illuminant conditions are desirable.

DETAILED DESCRIPTION OF THE DISCLOSED EMBODIMENTS

Figure 1:
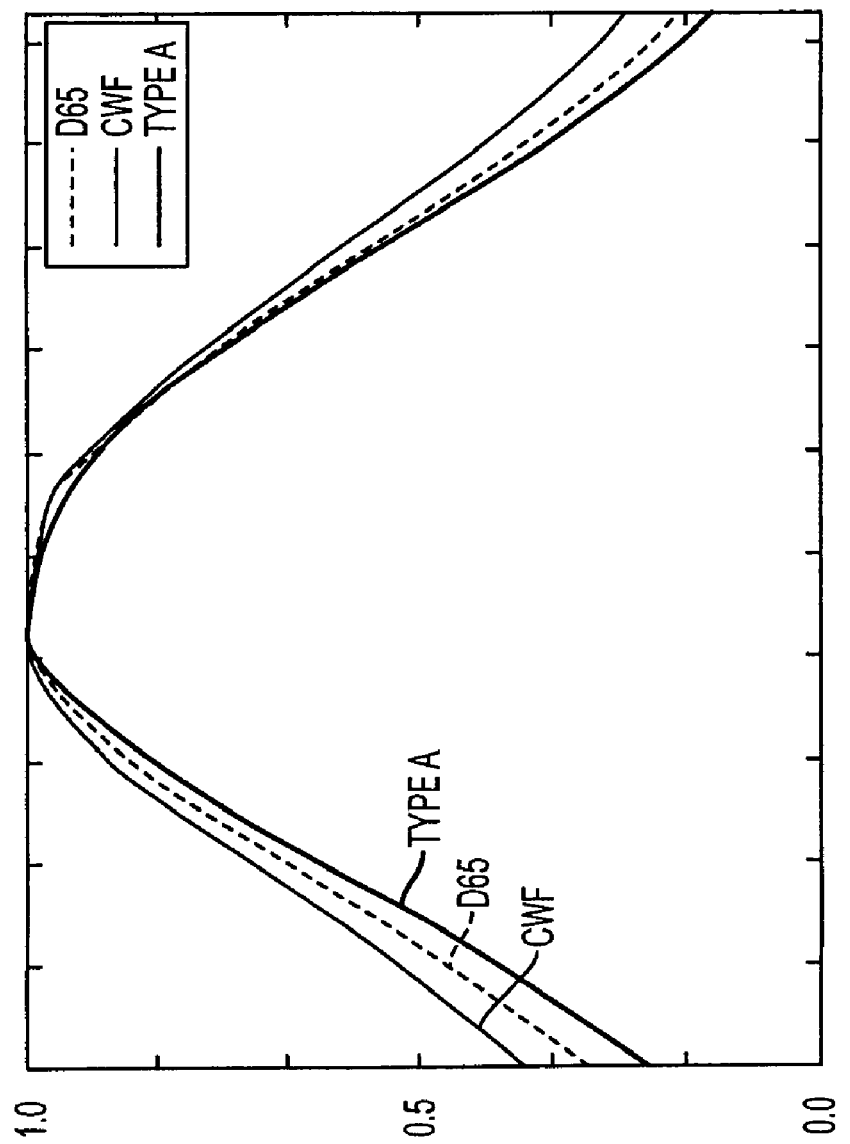
FIG. 1 illustrates the illuminant dependence of lens shading.

In the following detailed description, reference is made to the accompanying drawings which form a part hereof, and in which is shown by way of illustration specific embodiments that may be practiced. These embodiments are described in sufficient detail to enable those skilled in the art to make and use them, and it is to be understood that structural, logical or procedural changes may be made to the specific embodiments disclosed. Particularly, in the description below, processes are described by way of flowchart. In some instances, steps which follow other steps may be in reverse or in a different sequence, or simultaneously, except where a following procedural step requires the presence of a prior procedural step. The processes described herein may be implemented in a pixel processing pipeline which in turn can be implemented using discrete hardware circuits, e.g., an ASIC, a programmed processor, or a combination of the two, but are not limited to such an implementation.

Scene adaptive lens shading correction entails determining the illuminant type for a captured scene and modifying a reference gain adjustment surface with a scene adjustment surface corresponding to the determined illuminant type to obtain a scene adapted gain adjustment surface. A reference gain adjustment surface is a gain adjustment surface calibrated to a reference illuminant type. A scene adjustment surface represents the deviation between two gain adjustment surfaces each calibrated to a different illuminant type.

The measured deviation between two gain adjustment surfaces follows a parabolic pattern because only the wavelength of light changes while all other gain adjustment factors such as the shape of the pixel and the lens characteristics remain constant. A second order polynomial curve, therefore, provides a good approximation of a scene adjustment surface and a relatively small number of parameters is, thus, required to generate a scene adjustment surface. According to one example embodiment, as few as 8 parameters are required to generate a scene adjustment surface. In contrast, a relatively large number of parameters is required to generate a reference gain adjustment surface. Upwards of 100 parameters are required to generate a reference gain adjustment surface that is represented by a piecewise-quadratic function.

Disclosed embodiments lead to a relatively small number of parameters that need to be stored for each illuminant type for which lens shading correction is desired. A scene adjustment surface may be provided for each of the illuminant types that a camera and/or imaging device manufacturer wants to distinguish, e.g., D50, D65, incandescent, and fluorescent illuminants. Each scene adjustment surface can be stored as either a set of scene adjustment values themselves or as a set of parameters representing the scene adjustment surface, which can be used to generate the scene adjustment surface. Moreover, each scene adjustment surface is stored in association with an illuminant type.

According to the disclosed embodiments, storing a single reference gain adjustment surface is sufficient for scene adaptive lens shading correction. However, a reference gain adjustment surface may be provided for each of the color channels of a pixel array, e.g., green, red, and blue. If the green color channel is further separated into green-red and green-blue color channels, i.e., green pixel values from rows also containing red and blue pixel values respectively, then up to four reference gain adjustment surfaces may be employed respectively for the four color channels. Other color arrays, e.g., with red, green, blue and indigo channels, and associated color channel processing may also be employed. Likewise, a scene adjustment surface may be provided for each of the color channels of a pixel array for each of a plurality of possible scene illuminants.

Figure 2:
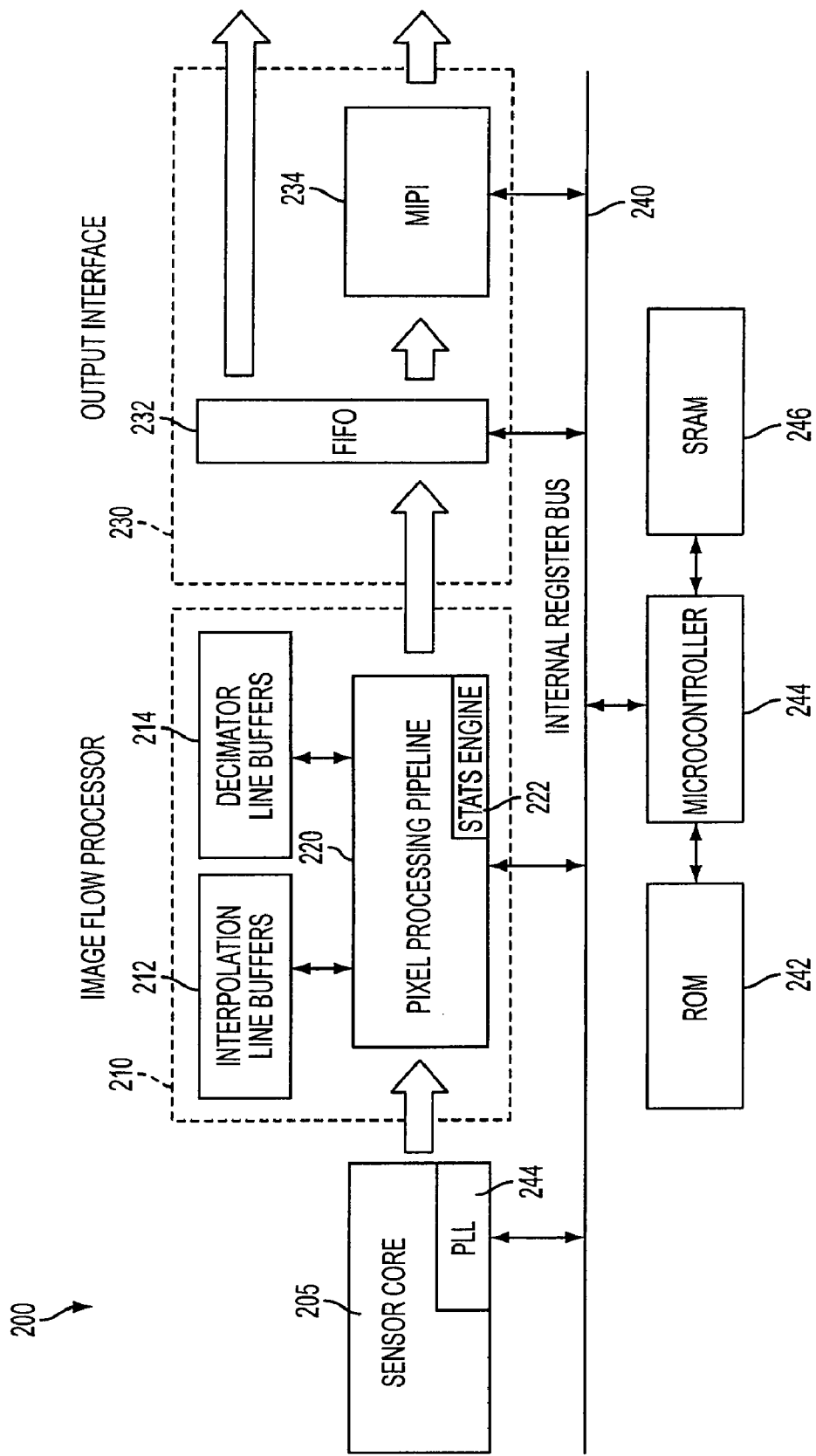
FIG. 2 illustrates a block diagram of system-on-a-chip imaging device constructed in accordance with an embodiment disclosed herein.

Turning to FIG. 2, one embodiment is now described in greater detail. FIG. 2 illustrates a block diagram of an exemplary system-on-a-chip (SOC) imaging device 200 constructed in accordance with an embodiment disclosed herein. The imaging device 200 comprises a sensor core 205 that communicates with an image flow processor 210 that is also connected to an output interface 230. A phase locked loop (PLL) 244 is used as a clock for the sensor core 205. The image flow processor 210, which is responsible for image and color processing, includes interpolation line buffers 212, decimator line buffers 214, and a pixel processing pipeline 220. One of the functions of the pixel processing pipeline 220 is to perform pixel processing operations, such as, for example, lens shading correction in accordance with the disclosed embodiments. The pixel processing pipeline 220 includes, among other things, a statistics engine 222. The output interface 230 includes an output first-in-first-out (FIFO) parallel output 232 and a serial Mobile Industry Processing Interface (MIPI) output 234. The user can select either a serial output or a parallel output by setting registers within the chip. An internal register bus 240 connects read only memory (ROM) 242, a microcontroller 244 and a static random access memory (SRAM) 246 to the sensor core 205, image flow processor 210 and the output interface 230. The read only memory (ROM) 242 may serve as a storage location for both the reference gain adjustment surface and the scene adjustment surface(s).

Figure 3:
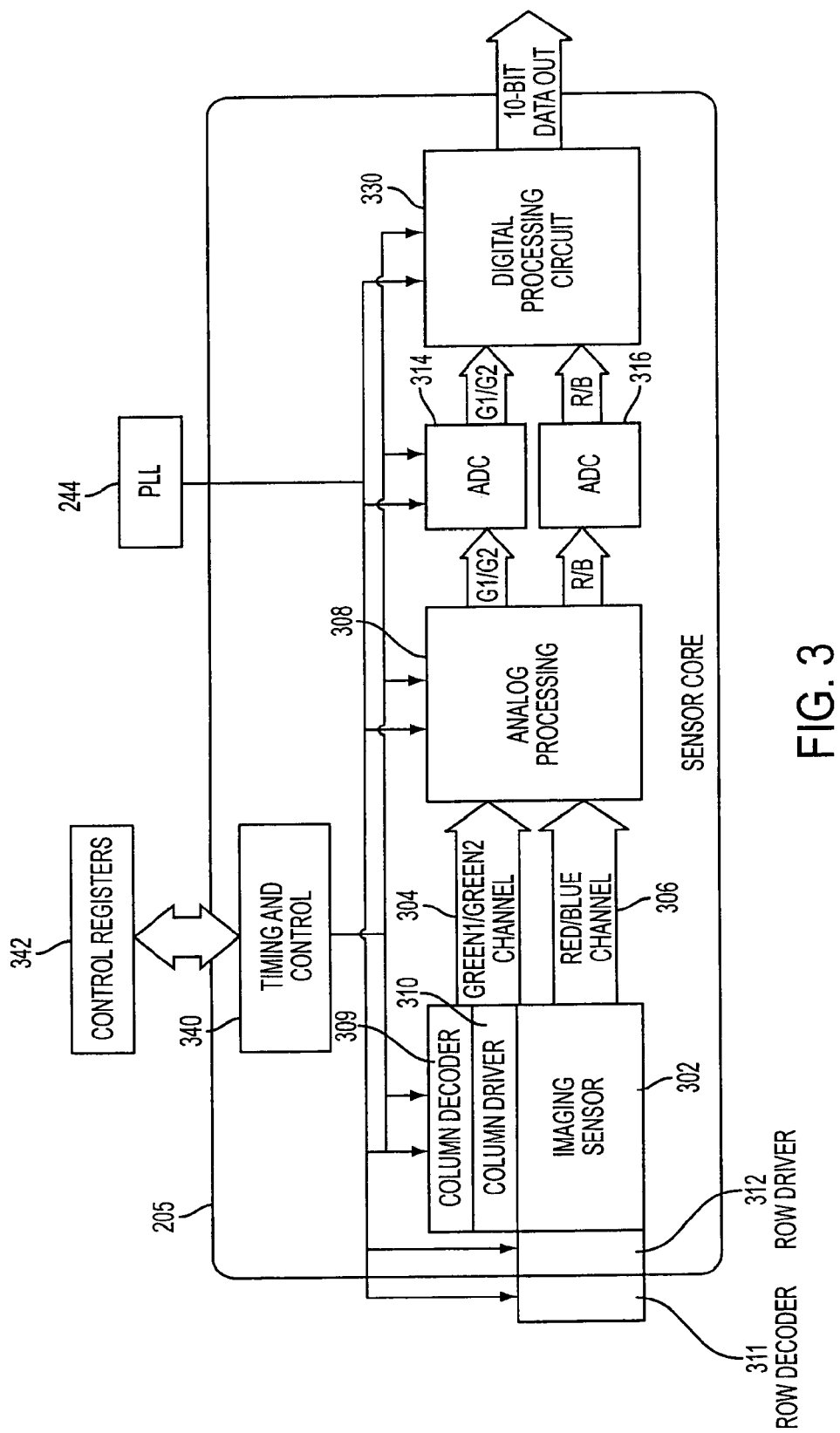
FIG. 3 illustrates an example of a sensor core used in the FIG. 2 device.

FIG. 3 illustrates a sensor core 205 used in the FIG. 2 imaging device 200. The sensor core 205 includes an imaging sensor 302, which is connected to analog processing circuitry 308 by a green-red/green-blue channel 304 and a red/blue channel 306. The red, blue, green-red, and green-blue colors come from the Bayer color filter pattern, which organizes a color filter array such that 50% is green, 25% red and 25% blue. Specifically, the red and blue pixel cells are arranged in rows and columns with a green pixel cell between every two red and blue pixel cells. Although only two channels 304, 306 are illustrated, there are effectively two green channels, one red channel, and one blue channel, for a total of four color channels. The green-red (i.e., Green1) and green-blue (i.e., Green2) signals are readout at different times (using channel 304) and the red and blue signals are readout at different times (using channel 306). The analog processing circuitry 308 outputs processed green-red/green-blue signals G1/G2 to a first analog-to-digital converter (ADC) 314 and processed red/blue signals R/B to a second analog-to-digital converter 316. The outputs of the two analog-to-digital converters 314, 316 are sent to a digital processor 330. It should be appreciated that while the sensor core 205 has been described with regard to four color channels, red, green-red, green-blue, and blue, the embodiments are not so limited in number or color. Additionally, the sensor core 205 represents one example of an architecture of a CMOS sensor core; however, disclosed embodiments can be used with any type of solid-state sensor core, including CCD and others.

Connected to, or as part of, the imaging sensor 302 are row and column decoders 311, 309 and row and column driver circuitry 312, 310 that are controlled by a timing and control circuit 340. The timing and control circuit 340 uses control registers 342 to determine how the imaging sensor 302 and other components are controlled, for example, controlling the mode of operation of the imaging sensor 302. As set forth above, the PLL 244 serves as a clock for the components in the core 205.

The imaging sensor 302 comprises a plurality of pixel circuits arranged in a predetermined number of columns and rows. In operation, the pixel circuits of each row in imaging sensor 302 are all operated on at the same time by a row select line and the pixel circuits of each column are selectively output onto column output lines by a column select line. A plurality of row and column lines are provided for the entire imaging sensor 302. The row lines are selectively activated by row driver circuitry 312 in response to the row address decoder 311 and the column select lines are selectively activated by a column driver 310 in response to the column address decoder 309. Thus, a row and column address is provided for each pixel circuit. The timing and control circuit 340 controls the address decoders 311, 309 for selecting the appropriate row and column lines for pixel readout, and the row and column driver circuitry 312, 310, which apply driving voltage to the drive transistors of the selected row and column lines.

For the CMOS architecture, however, each column contains sampling capacitors and switches in the analog processing circuit 308 that read a pixel reset signal Vrst and a pixel image signal Vsig for selected pixel circuits. Because the core 205 uses green-red/green-blue channel 304 and a separate red/blue channel 306, circuitry 308 will have the capacity to store Vrst and Vsig signals for green-red, green-blue, red, and blue pixel signals. A differential signal (Vrst-Vsig) is produced by differential amplifiers contained in the circuitry 308 for each pixel. Thus, each of the signals G1, G2, R, and B are differential signals that are then digitized by a respective analog-to-digital converter 314, 316. The analog-to-digital converters 314, 316 supply digitized G1, G2, R, and B pixel signals to the digital processor 330, which forms a digital image output (e.g., a 10-bit digital output). The digital processor 330 provides digital pixel values to the image flow processor 210 (FIG. 2).

Although the sensor core 205 has been described with reference to use with a CMOS imaging sensor, this is merely one example sensor core that may be used. Embodiments described herein may also be used with other sensor cores, including those supporting CCD, and other sensors having a different readout architecture. While the imaging device 200 (FIG. 2) has been shown as a system-on-a-chip, it should be appreciated that the embodiments are not so limited. Other imaging devices, such as, for example, a stand-alone sensor core 205 coupled to a separate signal processing chip could be used in accordance with the embodiments. While lens shading correction has been described as occurring in the pixel processing pipeline 220 (FIG. 2), it should be appreciated that lens shading correction can be performed in the digital processor 330 (FIG. 3). Additionally, raw imaging data can be output from the 10-bit data output (FIG. 3) and stored and corrected elsewhere, for example, in a system as described in relation to FIG. 7 or in a stand-alone image processing system.

Figure 4:
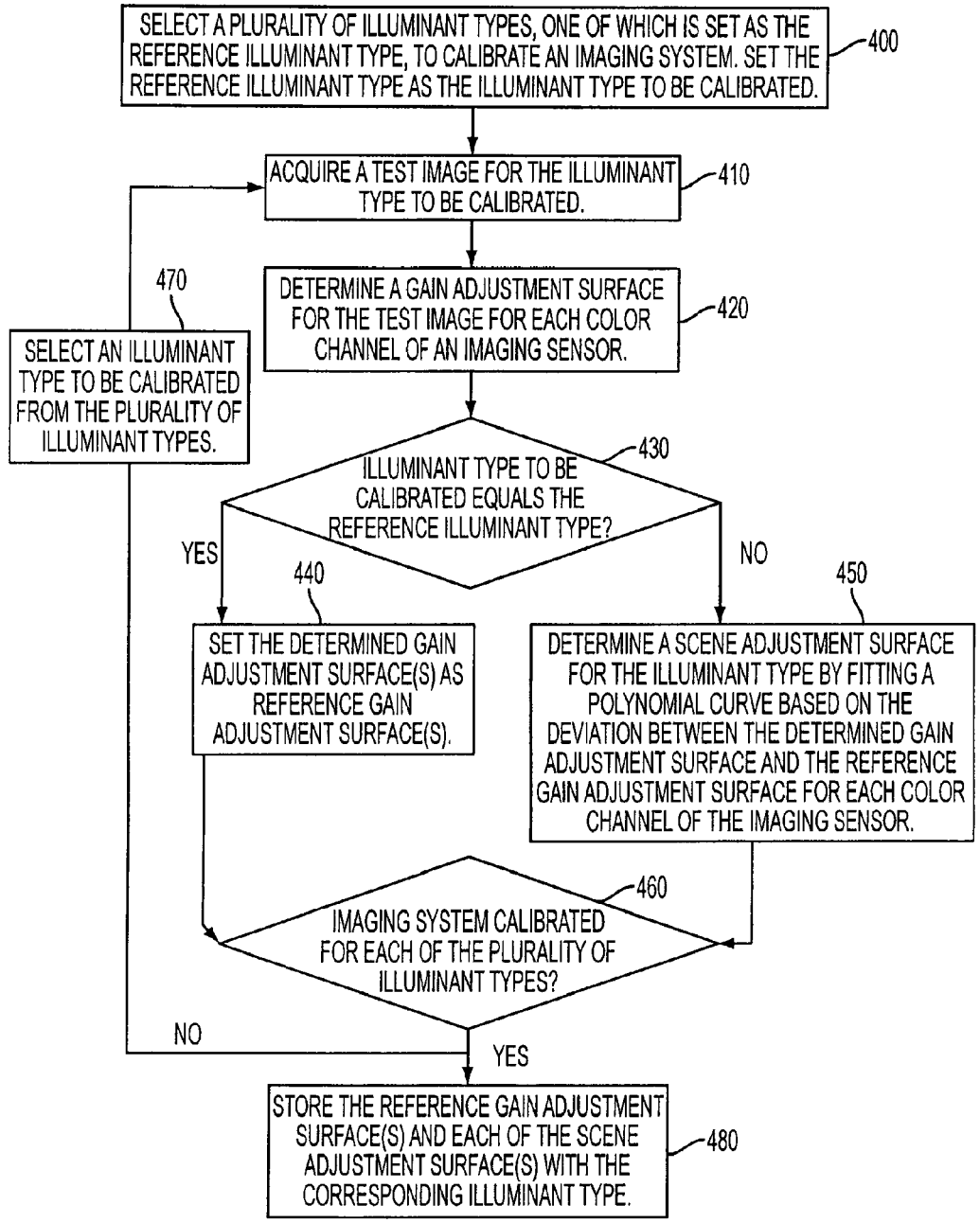
FIG. 4 illustrates a process for determining scene adjustment surfaces for a plurality of illuminant types in accordance with disclosed embodiments.

Prior to using imaging device 200, the device 200 is calibrated for each illuminant type for which lens shading correction is desired. FIG. 4 illustrates, according to one example embodiment, how to determine scene adjustment surface(s) during a calibration process for the imaging device 200 (FIG. 2). A plurality of illuminant types is selected to calibrate the imaging device 200 at step 400. A reference illuminant type is selected from the plurality of illuminant types and set as the illuminant type to be calibrated. In one example embodiment, the illuminant type that has the least amount of residual error to a test image is selected as the reference illuminant type. In another example embodiment, the reference illuminant type is selected based on a numerical analysis that minimizes the residual errors in the calibration of other illuminant types. Other methods of selecting a reference illuminant type may also be employed at step 400.

At step 410, a test image is acquired while the imaging device 200 is trained upon a scene depicting the illuminant type to be calibrated. At step 420, the variations in pixel responsiveness across the imaging sensor 302 (FIG. 3) are measured and a corresponding gain adjustment surface for each color channel of the imaging sensor 302 is determined.

If at step 430 it is determined that the illuminant type used to acquire the test image at step 410 is the reference illuminant type, then the process proceeds to step 440 where the gain adjustment surface(s) determined at step 420 is set as the reference gain adjustment surface(s). However, if at step 430 the illuminant type to be calibrated is not the reference illuminant type, then the process proceeds to step 450 where a scene adjustment surface is determined for the illuminant type to be calibrated based on the deviation between the gain adjustment surface determined at step 420 and the reference gain adjustment surface set at step 440 for each color channel of the imaging sensor 302.

Embodiments described herein provide a scene adjustment surface Scene_Adj(x, y) approximated by a second order polynomial curve fitting. The scene adjustment surface may be approximated as follows:

$$\text{Scene\_Adj}(x,y) = \text{Bias} - \text{Scaler}[A_N(x-c_x)^2 + B_N(x-c_x) + C_N(y-c_y)^2 + D_N(y-c_y)] \quad (1)$$

where x and y are pixel coordinates, $A_N$, $B_N$, $C_N$, and $D_N$ are the polynomial coefficients that determine the shape of a parabolic surface, Scaler is a scaling parameter, Bias is an offset parameter, and $c_x$ and $c_y$ refer to the center of the imaging sensor 302 (FIG. 3).

Surface fitting parameters, $A_N$, $B_N$, $C_N$, $D_N$, Bias, Scaler, $c_x$, and $c_y$ may be determined using any calibration method. In one example embodiment, the calibrating image used to obtain the reference gain adjustment surface can also be used to derive $c_x$ and $c_y$, the center of the imaging sensor 302. The center of the imaging sensor 302 can refer to either the optical center or the geometric center of the pixel array. The optical center of the imaging sensor is the pixel coordinate where the adjustment of the pixel gain correction will remain at unity gain. Thus, at the location ($c_x$, $c_y$), the scene adjustment function in Equation (1) simplifies to the offset parameter Bias. With known center coordinates ($c_x$, $c_y$), the surface fitting parameters, $A_N$, $B_N$, $C_N$, $D_N$, Bias, Scaler, may be derived by any method of determining surface fitting parameters, such as, for example exhaustive search or numerical optimization (e.g., least squares fit).

In addition to using the disclosed embodiments for scene adaptive lens shading correction, the disclosed embodiments can also be used to reduce the digital gains for low-light scenes where brightness fall-off is more acceptable for achieving a reduced appearance of noise. The scaling parameter Scaler in Equation (1) is used to adjust the strength of the polynomial surface for low-light scenes.

As noted above, a color image sensor may define a scene adjustment surface for each of the color channels of the pixel array. For example, a color image sensor that divides its pixel array into the four Bayer color planes, i.e., red (R), blue (B), green-red (GR), and green-blue (GB), would require four scene adjustment surfaces for each illuminant type where the polynomial coefficients span into four sets of parameters as follows:

$$(A_R, B_R, C_R, D_R) \ (A_B, B_B, C_B, D_B) \ (A_{GR}, B_{GR}, C_{GR}, D_{GR}) \ (A_{GB}, B_{GB}, C_{GB}, D_{GB}) \quad (2)$$

It is possible for the color imaging sensor 302 (FIG. 3) to have three, five, or any number of color channels depending on the geometry of the pixel layout, e.g., cyan, magenta, yellow (CMY); cyan, magenta, yellow, black (CMYK); or red, green, blue, indigo (RGBI).

For a Bayer color filter array, Equations (1) and (2) above imply that there will be 18 parameters for each additional illuminant type incorporated into a scene adaptive lens shading correction operation, as shown below:

$$(4 \text{ polynomial coefficients} * 4 \text{ color planes}) + \text{Bias} + \text{Scaler} = 18 \text{ parameters} \quad (3)$$

Typically, a camera and/or imaging device 200 manufacturer will want to distinguish among three illuminant types:

D65, D50, and Type A flat-fields. Some manufacturers may also want to distinguish an industry standard fluorescent light. Assuming a D65 flat-field image is used to calibrate the reference gain adjustment surface for imaging device 200 (FIG. 2) and the imaging device 200 is set to also distinguish the illuminant types D50, Type A, and cool white fluorescent, then the total number of scene adjustment parameters that need to be maintained equals 18*3=54 parameters.

Depending on the parameter values selected, it is possible to simplify the mathematical framework for the scene adjustment surface. In another embodiment, the polynomial coefficients $B_N$ and $D_N$ can both be set to zero, simplifying Scene_Adj(x, y) to an ellipse:

$$\text{Scene\_Adj}(x,y) = \text{Bias} - \text{Scaler}[A_N(x-c_x)^2 + C_N(y-c_y)^2] \quad (4)$$

For a Bayer color filter array, Equations (2) and (4) above imply that there will be 10 parameters for each additional illuminant type incorporated into a scene adaptive lens shading correction operation, as shown below:

$$(2 \text{ polynomial coefficients} * 4 \text{ color planes}) + \text{Bias} + \text{Scaler} = 10 \text{ parameters} \quad (5)$$

In yet another embodiment, it is possible to simplify the mathematical framework even more. The polynomial coefficients $B_N$, $C_N$, and $D_N$ can all be set to zero, simplifying Scene_Adj(x, y) to a parabola:

$$\text{Scene\_Adj}(x,y) = \text{Bias} - \text{Scaler} * A_N[(x-c_x)^2 + (y-c_y)^2] \quad (6)$$

For a Bayer color filter array, Equations (2) and (6) above imply that there will be only 8 parameters for each additional illuminant type incorporated into a scene adaptive lens shading correction operation, as shown below:

$$(1 \text{ polynomial coefficient} * 4 \text{ color planes}) + \text{Bias} + \text{Scaler} = 8 \text{ parameters} \quad (7)$$

As noted above, a second order polynomial curve provides a good approximation for a scene adjustment surface because only the wavelength of light changes in gain adjustment surfaces across multiple illuminants. However, it should be noted that the polynomial curve is not restricted to the second order. As the order of the polynomial increases, the number of parameters that need to be stored also increases. Therefore, the example embodiments described above use second order polynomial curves to approximate scene adjustment surfaces in order to obtain a low cost implementation, which can be efficiently implemented in both hardware and software.

Referring back to FIG. 4, after a scene adjustment surface for each color channel of the imaging sensor 302 is determined at step 450, the calibration process proceeds to step 460 where a determination is made as to whether each of the plurality of illuminant types have been calibrated. The illuminant types for which scene adjustment surfaces are determined include only a subset of all possible illuminant conditions. The number of illuminant types to be calibrated should produce a sufficient number of stored scene adjustment surfaces to permit embodiments to approximate scene adaptive gain adjustment surfaces for all illuminant conditions for which lens shading correction is desired. Lens shading correction will become more accurate as more illuminant types are calibrated for the imaging device 200 (FIG. 2).

If more illuminant types need to be calibrated, the calibration process proceeds to step 470 where the next illuminant type to be calibrated is selected from the plurality of illuminant types. The calibration process repeats steps 410, 420, 430, 450, 460, and 470 until it is determined that each of the plurality of illuminant types have been calibrated.

Once all desired illuminant types have been calibrated, the calibration process proceeds to step 480 where the set(s) of parameters determined for the reference gain adjustment surface(s) and the reference illuminant type are stored in imaging device 200, for example, in ROM 242 (FIG. 2) or another form of storage (e.g., registers). Furthermore, at step 480, the set of parameters determined for each scene adjustment surface and its associated illuminant type are likewise stored. It should be noted that the calibration process illustrated in FIG. 4 is not required for each individual imaging device 200, but may be performed once for all imaging devices 200, which are similarly constructed with the calibrated reference gain adjustment and scene adjustment surfaces stored in each imaging device 200.

Before scene adaptive lens shading correction begins on a captured image in an imaging device 200, the illuminant type present in a captured scene is determined. The illuminant type may be directly sampled by a camera with multi-spectral imaging capability or estimated by using a proprietary method or by comparing the color bias of the captured image with that of known illuminant types. If the determined illuminant type matches the reference illuminant type used to calibrate the reference gain adjustment surface(s), then no scene adjustment surface is needed and the reference gain adjustment surface(s) is used without modification for lens shading correction. On the other hand, if the determined illuminant type does not match the reference illuminant type then each of the reference gain adjustment surfaces is modified by either a stored scene adjustment surface associated with the determined illuminant type or a stored scene adjustment surface associated with an illuminant type which corresponds closest to the determined illuminant type to obtain a scene adapted gain adjustment surface. Finally, pixel correction values for each pixel in the pixel array are calculated using the scene adapted gain adjustment surface and applied to each pixel in the pixel array.

Figure 5:
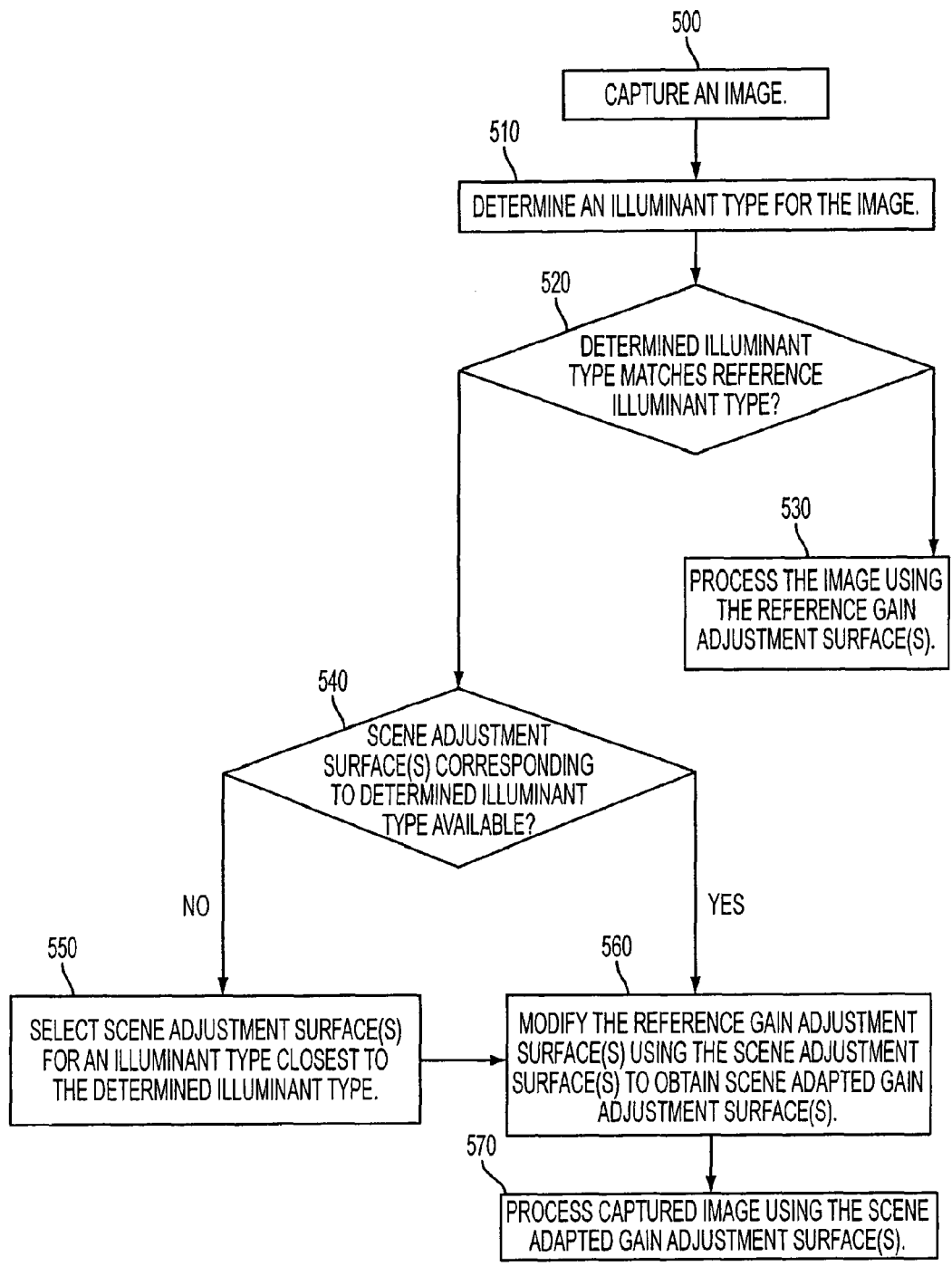
FIG. 5 illustrates a process for scene adaptive lens shading correction of pixel values for a captured image in accordance with disclosed embodiments.

FIG. 5 illustrates a process of performing scene adaptive lens shading correction in accordance with the disclosed embodiments. Following the calibration process depicted in FIG. 4, an imaging device 200 (FIG. 2) has a stored gain adjustment surface calibrated to a reference illuminant type for each color channel of an imaging sensor 302 and a stored scene adjustment surface for each of a plurality of illuminant types for each color channel of an imaging sensor 302. Scene adaptive lens shading correction, in accordance with FIG. 5, is performed by the pixel processing pipeline 220 of image flow processor 210 (FIG. 2) using the stored reference gain adjustment surface(s) and, if necessary, stored scene adjustment surface(s) acquired during the calibration operation. The image processor circuit 210 has access to the stored gain adjustment surface(s) and scene adjustment surface(s) in, for example, ROM 242 (FIG. 2) or other memory.

Scene adaptive lens shading correction begins with capturing an image at step 500. At step 510, the spectral content, or illuminant type, of the captured image is determined. As noted above, the illuminant type may be determined in a number of different ways, which are well known to persons skilled in the art of image processing. For example, illuminant discrimination techniques are used in camera operations employing an imaging device 200 other than lens shading correction such as auto white balancing and color correction. These techniques estimate the illuminant type based on estimating the color temperature of a captured image. Therefore, camera operations such as auto white balancing can be used to estimate the illuminant type for scene adaptive lens shading correction. While the SOC imaging device 200 implements the auto white balancing function on-chip using devices such as the statistics engine 222 (FIG. 2) and firmware, the function may also be performed in a separate processor. Other digital cameras employing imaging device 200 use a separate sensor to directly sample the spectrum of a captured scene or infer the illuminant in a captured image based on the sampling of the light spectrum.

Figure 6:
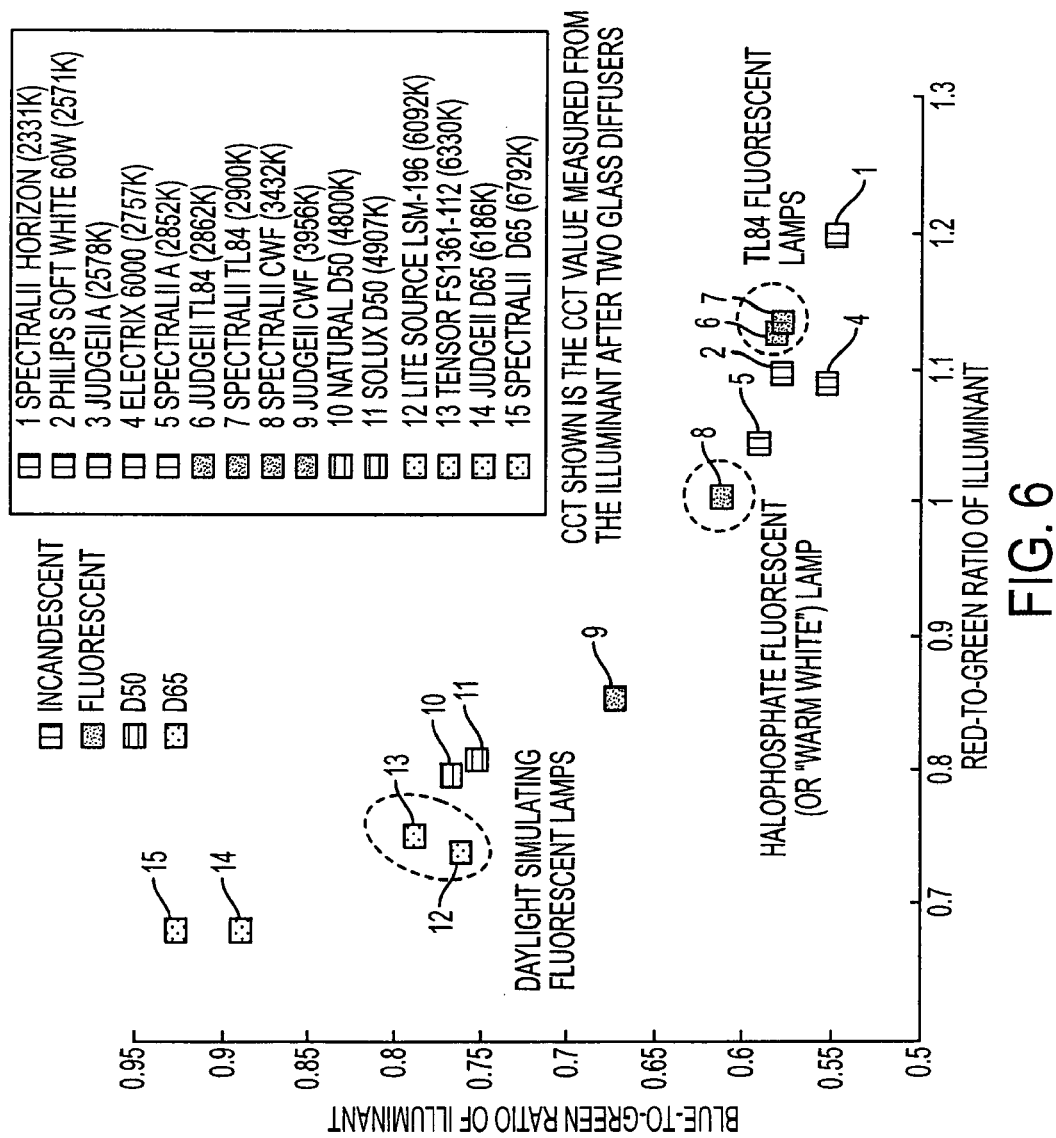
FIG. 6 illustrates the color ratios of pixels according to illuminant type.

Another method of discriminating between illuminant types is to compare the color ratios of pixels that capture the neutral tones of a captured scene with the known color ratios of different illuminant types. FIG. 6 illustrates the color ratios of different illuminant types. Different techniques can be used to select the pixels that capture the neutral or gray tones of a scene. For example, using a camera's spectral sensitivity, which is typically measured during a camera's post-manufacturing process, captured pixels with color ratios that fall on or close to the spectral sensitivity curve are most likely to have captured the neutral tones of the captured scene. As shown in FIG. 6, incandescent lights have generally high R/G ratio and low B/G ratio as compared to other illuminant types. A stored illuminant type with color ratios closest to the color ratios from the captured scene can be selected as the illuminant type. If the color ratio is close to more than one illuminant type then the selection may be made based on a priority system. For example, FIG. 6 shows that it is difficult to distinguish daylight simulating fluorescent lamps (12, 13) from real daylight (10) and Solux simulated daylight (11). In this case, an illuminant discrimination method could specify that real daylight has priority over daylight simulating fluorescent lamps.

At step 520 in FIG. 5, the determined illuminant type is compared to the reference illuminant type used to calibrate the reference gain adjustment surface(s) in FIG. 4 (step 440). If at step 520 it is determined that the illuminant type matches within a predetermined margin of error the reference illuminant type, the process proceeds to step 530 where lens shading correction is performed on the pixel values of the captured image using the reference gain adjustment surface(s).

If at step 520, however, it is determined that the illuminant type does not match the reference illuminant type within the predetermined margin of error, the process proceeds to step 540 where a determination is made as to whether stored scene adjustment surfaces corresponding to the determined illuminant type are available. If scene adjustment surfaces corresponding to the determined illuminant type are available, then they are used to modify the reference gain adjustment surfaces at step 560. On the other hand, if at step 540, it is determined that no stored scene adjustment surface corresponds to the determined illuminant type, then the stored scene adjustment surfaces associated with an illuminant type which correspond closest to the determined illuminant type are selected to modify the reference gain adjustment surfaces at step 550. One method of selecting stored scene adjustment surfaces is to use the plot of color ratios discussed above with respect to discriminating illuminants to find the stored scene adjustment surfaces associated with the illuminant type that have the shortest distance to the determined illuminant type. If more than one illuminant type is equally distanced from the determined illuminant type then one of the illuminant types can be selected based on a priority system.

At step 560, the reference gain adjustment surface is modified by the stored scene adjustment surface selected at step 550 or step 540 to obtain a scene adapted gain adjustment surface. For a color image sensor that stored a reference gain adjustment surface and scene adjustment surface for each color channel of the image sensor, each reference gain adjustment surface is modified by the stored scene adjustment surface of the corresponding color channel. In one example embodiment, the modification consists of multiplying a reference gain adjustment surface by a scene adjustment surface, as shown below:

$$\text{Scene\_Adaptive\_LSC}(x,y) = \text{LSC}(x,y) * \text{Scene\_Adj}(x,y) \quad (8)$$

where x and y are pixel coordinates, LSC(x, y) is a function to derive the reference gain adjustment value for the pixel located at (x, y) which does not change with the determined illuminant type, and Scene_Adj(x, y) is a function that modifies the gain adjustment value for the pixel located at (x, y) which varies as a function of the determined illuminant type.

After scene adapted gain adjustment surfaces have been determined at step 560, lens shading correction is performed on the pixel values of the captured image at step 570 using the scene adapted gain adjustment surfaces.

Figure 7:
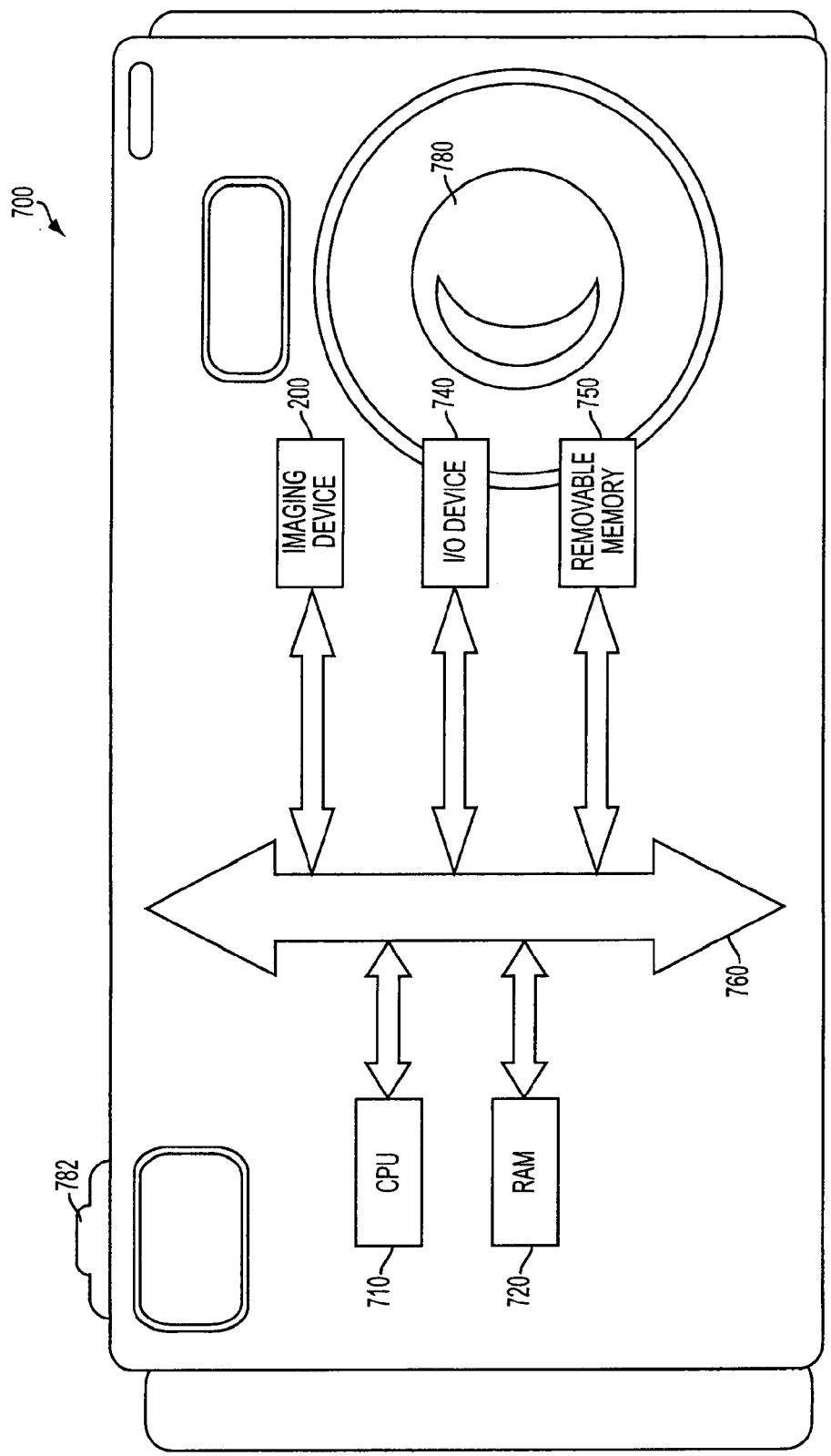
FIG. 7 shows a system embodiment incorporating at least one imaging device.

FIG. 7 shows a typical system 700, such as, for example, a camera that could include imaging device 200 (FIG. 2). Without being limiting, such a system could include a computer system, camera system, scanner, machine vision, vehicle navigation system, video phone, surveillance system, auto focus system, star tracker system, motion detection system, image stabilization system, and other systems employing an imaging device 200.

According to one example embodiment, system 700 includes a lens 780 for focusing an image on the imaging device 200 when a shutter release button 782 is pressed. System 700 generally comprises a central processing unit (CPU) 710, such as a microprocessor that controls camera functions and image flow, and communicates with an input/output (I/O) device 740 over a bus 760. The imaging device 200 also communicates with the CPU 710 over the bus 760. The system 700 also includes random access memory (RAM) 720, and can include removable memory 750, such as flash memory, which also communicates with the CPU 710 over the bus 760. The imaging device 200 may be combined with the CPU 710, with or without memory storage on a single integrated circuit, such as, for example, a system-on-a-chip, or on a different chip than the CPU 710. As described above, raw RGB image data from the imaging sensor 302 (FIG. 3) can be output from the imaging device 200 and can be stored, for example in the random access memory 720 or the CPU 710. Lens shading correction can then be performed on the raw RGB image data or on the stored data in accordance with disclosed embodiments. In other embodiments, lens shading correction can be performed on the raw RGB data or the stored data by the CPU 710, or can be sent outside the camera and operated on by a stand-alone processor, e.g., a computer, external to system 700.

Disclosed embodiments provide a low cost scene adaptive lens shading correction method that requires the storage of parameters for a single reference gain adjustment surface and for at least one scene adjustment surface. Because a second order polynomial curve provides a good approximation for a scene adjustment surface, the disclosed embodiments lead to a relatively small number of parameters that need to be stored for each additional illuminant type for which lens shading correction is desired. Additionally, the disclosed embodiments can be implemented in hardware or software at low cost. That is, the methods described above can be implemented in a pixel processing circuit, which can be part of the pixel processing pipeline 220 (FIG. 2). The pixel processing circuit can be implemented as, for example, hardware logic, a programmed processor, a combination of the two, or with other signal processing circuits. The methods described above can be implemented in computer instructions and stored in a computer readable medium to perform the steps outlined above.

While the embodiments have been described in detail in connection with embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with image data from other types of imaging sensors, for example, CCD imagers and others.

What is claimed as new and desired to be protected by Letters Patent of the United States is:

1. A method of processing an image, the method comprising:
   determining one or more gain adjustment surfaces for a reference illuminant type that is selected from a plurality of illuminant types;
   determining an illuminant type for the image to be processed;
   modifying each of the gain adjustment surfaces using a scene adjustment surface determined based on the illuminant type for the image to be processed; and
   processing the image using the one or more modified gain adjustment surfaces, wherein each gain adjustment surface is determined for the reference illuminant type for each color channel of a pixel array in an image sensor, wherein the scene adjustment surface is a polynomial curve based on the deviation between two gain adjustment surfaces, wherein the polynomial curve is a function of a center of the image sensor, a scaling parameter, an offset parameter, and at least one surface fitting parameter, and wherein the scaling parameter adjusts the strength of the polynomial curve for low-light scenes.

2. The method of claim 1, wherein the plurality of illuminant types comprises a D65 flat-field, a D50 flat-field, and a Type A flat-field.

3. The method of claim 1, wherein the surface fitting parameters for the polynomial curve span into a plurality of sets of parameters, one set for each color channel of the pixel array in the image sensor.

4. A method of processing an image, the method comprising:
   determining one or more gain adjustment surfaces for a reference illuminant type that is selected from a plurality of illuminant types;
   determining an illuminant type for the image to be processed;
   modifying each of the gain adjustment surfaces using a scene adjustment surface determined based on the illuminant type for the image to be processed; and
   processing the image using the one or more modified gain adjustment surfaces, wherein each gain adjustment surface is determined for the reference illuminant type for each color channel of a pixel array in an image sensor, wherein the scene adjustment surface is a polynomial curve based on the deviation between two gain adjustment surfaces, wherein the polynomial curve is a function of a center of the image sensor, a scaling parameter, an offset parameter, and at least one surface fitting parameter, wherein the surface fitting parameters for the polynomial curve span into a plurality of sets of parameters, one set for each color channel of the pixel array in the image sensor, and wherein the polynomial curve is determined according to:

$$\text{Scene\_Adj}(x,y) = \text{Bias} - \text{Scaler}[A_N(x-c_x)^2 + B_N(x-c_x) + C_N(y-c_y)^2 + D_N(y-c_y)]$$

where x and y are pixel coordinates, $A_N$, $B_N$, $C_N$, and $D_N$ are the surface fitting parameters that determine the shape of the polynomial curve, Scaler is the scaling parameter, Bias is the offset parameter, and $c_x$ and $c_y$ refers to the center of the image sensor.

5. A method of processing an image, the method comprising:
   determining one or more gain adjustment surfaces for a reference illuminant type that is selected from a plurality of illuminant types;
   determining an illuminant type for the image to be processed;
   modifying each of the gain adjustment surfaces using a scene adjustment surface determined based on the illuminant type for the image to be processed; and
   processing the image using the one or more modified gain adjustment surfaces, wherein each gain adjustment surface is determined for the reference illuminant type for each color channel of a pixel array in an image sensor, wherein the scene adjustment surface is a polynomial curve based on the deviation between two gain adjustment surfaces, wherein the polynomial curve is a function of a center of the image sensor, a scaling parameter, an offset parameter, and at least one surface fitting parameter, wherein the surface fitting parameters for the polynomial curve span into a plurality of sets of parameters, one set for each color channel of the pixel array in the image sensor, and wherein the polynomial curve is determined according to:

$$\text{Scene\_Adj}(x,y) = \text{Bias} - \text{Scaler}[A_N(x-c_x)^2 + C_N(y-c_y)^2]$$

where x and y are pixel coordinates, $A_N$ and $C_N$ are the surface fitting parameters that determine the shape of the polynomial curve, Scaler is the scaling parameter, Bias is the offset parameter, and $c_x$ and $c_y$ refers to the center of the image sensor.

6. The method of claim 3, A method of processing an image, the method comprising:
   determining one or more gain adjustment surfaces for a reference illuminant type that is selected from a plurality of illuminant types;
   determining an illuminant type for the image to be processed;
   modifying each of the gain adjustment surfaces using a scene adjustment surface determined based on the illuminant type for the image to be processed; and
   processing the image using the one or more modified gain adjustment surfaces, wherein each gain adjustment surface is determined for the reference illuminant type for each color channel of a pixel array in an image sensor, wherein the scene adjustment surface is a polynomial curve based on the deviation between two gain adjustment surfaces, wherein the polynomial curve is a function of a center of the image sensor, a scaling parameter, an offset parameter, and at least one surface fitting parameter, wherein the surface fitting parameters for the polynomial curve span into a plurality of sets of parameters, one set for each color channel of the pixel array in the image sensor, and wherein the polynomial curve is determined according to:

$$\text{Scene\_Adj}(x,y) = \text{Bias} - \text{Scaler}[A_N(x-c_x)^2 + (y-c_y)^2]$$

where x and y are pixel coordinates, $A_N$ is the surface fitting parameter that determines the shape of the polynomial curve, Scaler is the scaling parameter, Bias is the offset parameter, and $c_x$ and $c_y$ refers to the center of the image sensor.

7. An imaging device comprising:
an imaging sensor comprising an array of imaging pixels;
a storage device for storing at least one set of gain adjustment surface parameters and at least one set of scene adjustment surface parameters; and
a signal processing circuit for adjusting signals from the array, the signal processing circuit configured to:
determine a gain adjustment value using one of the sets of stored gain adjustment surface parameters;
determine a scene adjustment value using one of the sets of stored scene adjustment surface parameters that is selected based on an illuminant type;
modify the gain adjustment value using the scene adjustment value; and
generate a corrected pixel signal using the modified gain adjustment value, wherein the scene adjustment value is a function of a center of the image sensor, a scaling parameter, an offset parameter, and at least one surface fitting parameter and wherein the signal processing circuit determines the scene adjustment value according to:

$$\text{Scene\_Adj}(x,y)=\text{Bias}-\text{Scaler}[A_N(x-c_x)^2+B_N(x-c_x)+C_N(y-c_y)^2+D_N(y-c_y)]$$

where x and y are pixel coordinates, $A_N$, $B_N$, $C_N$, and $D_N$ are the surface fitting parameters that determine the shape of a polynomial curve, Scaler is the scaling parameter, Bias is the offset parameter, and $c_x$ and $c_y$ refers to the center of the image sensor.

8. The imaging device of claim 7, wherein the storage device stores one set of gain adjustment surface parameters for each color channel of the array and each set of parameters is calibrated to a reference illuminant type.

9. The imaging device of claim 8, wherein the storage device stores one set of scene adjustment surface parameters for each of a plurality of illuminant types and each set of parameters is stored in association with the illuminant type.

10. The imaging device of claim 8, wherein the storage device stores one set of scene adjustment surface parameters for each color channel of the array for each of the plurality of illuminant types.

11. The imaging device of claim 7, wherein the storage device stores (4*N)+2 number of parameters for each illuminant type, where N represents the number of color channels in the imaging sensor.

12. An imaging device comprising:
an imaging sensor comprising an array of imaging pixels;
a storage device for storing at least one set of gain adjustment surface parameters and at least one set of scene adjustment surface parameters; and
a signal processing circuit for adjusting signals from the array, the signal processing circuit configured to:
determine a gain adjustment value using one of the sets of stored gain adjustment surface parameters;
determine a scene adjustment value using one of the sets of stored scene adjustment surface parameters that is selected based on an illuminant type;
modify the gain adjustment value using the scene adjustment value; and
generate a corrected pixel signal using the modified gain adjustment value, wherein the scene adjustment value is a function of a center of the image sensor, a scaling parameter, an offset parameter, and at least one surface fitting parameter, and wherein the signal processing circuit determines the scene adjustment value according to:

$$\text{Scene\_Adj}(x,y)=\text{Bias}-\text{Scaler}[A_N(x-c_x)^2+C_N(y-c_y)^2]$$

where x and y are pixel coordinates, $A_N$ and $C_N$ are the surface fitting parameters that determine the shape of a polynomial curve, Scaler is the scaling parameter, Bias is the offset parameter, and $c_x$ and $c_y$, refers to the center of the image sensor.

13. An imaging device comprising:
an imaging sensor comprising an array of imaging pixels;
a storage device for storing at least one set of gain adjustment surface parameters and at least one set of scene adjustment surface parameters; and
a signal processing circuit for adjusting signals from the array, the signal processing circuit configured to:
determine a gain adjustment value using one of the sets of stored gain adjustment surface parameters;
determine a scene adjustment value using one of the sets of stored scene adjustment surface parameters that is selected based on an illuminant type;
modify the gain adjustment value using the scene adjustment value; and
generate a corrected pixel signal using the modified gain adjustment value, wherein the scene adjustment value is a function of a center of the image sensor, a scaling parameter, an offset parameter, and at least one surface fitting parameter, and wherein the processing circuit determines the scene adjustment value according to:

$$\text{Scene\_Adj}(x,y)=\text{Bias}-\text{Scaler}*A_N[(x-c_x)^2+(y-c_y)^2]$$

where x and y are pixel coordinates, $A_N$ is the surface fitting parameter that determines the shape of a polynomial curve, Scaler is the scaling parameter, Bias is the offset parameter, and $c_x$ and $c_y$ refers to the center of the image sensor.

14. The imaging device of claim 13, wherein the storage device stores N+2 number of parameters for each illuminant type, where N represents the number of color channels in the imaging sensor.

* * * * *